United States Patent [19]

Potter

[11] Patent Number: 4,749,228

[45] Date of Patent: Jun. 7, 1988

[54] SEAT STRUCTURE FOR ATTACHMENT TO A GOLF CART OR TROLLEY

[75] Inventor: George P. Potter, Cambridge, England

[73] Assignee: Acushnet Limited, Cambridge, England

[21] Appl. No.: 39,581

[22] Filed: Apr. 16, 1987

[30] Foreign Application Priority Data

Apr. 17, 1986 [GB] United Kingdom ............... 8609424

[51] Int. Cl.⁴ ............................................. A47C 31/00
[52] U.S. Cl. ............................ 297/217; 280/DIG. 6; 248/156; 297/314
[58] Field of Search ..................... 297/217, 314; 280/DIG. 6, 47.26; 248/156, 161, 404

[56] References Cited

U.S. PATENT DOCUMENTS

| | | | |
|---|---|---|---|
| 522,387 | 7/1894 | Pederson | 297/314 X |
| 641,169 | 1/1900 | Thibault | 297/314 X |
| 2,673,589 | 3/1954 | Kunkel | 280/DIG. 6 |
| 2,800,164 | 7/1957 | Chambers | 248/156 X |
| 3,124,329 | 3/1964 | Ransom et al. | 248/161 |
| 3,162,461 | 12/1964 | Krell | 280/47.26 X |
| 4,318,567 | 3/1982 | Guthier | 248/156 X |
| 4,595,237 | 6/1986 | Nelson | 248/404 |

FOREIGN PATENT DOCUMENTS 696699 9/1953 United Kingdom ......... 280/DIG. 6

Primary Examiner—Francis K. Zugel
Attorney, Agent, or Firm—Renner, Otto, Boisselle & Sklar

[57] ABSTRACT

A seat structure which can be attached to a golf cart or trolley comprises a stem provided at one end with a seat and at its other end with a pointed member, said stem extending through a tube and being slidable therein, a spring extends between the tube and the upper end of the stem to urge the stem upwardly and the tube is pivotally connected by a pivot to a mounting tube which can be secured to a support member provided on the trolley by a securing member, and a plate spring is provided for returning the stem to a means or equilibrium position after it has been moved about the pivot.

10 Claims, 2 Drawing Sheets

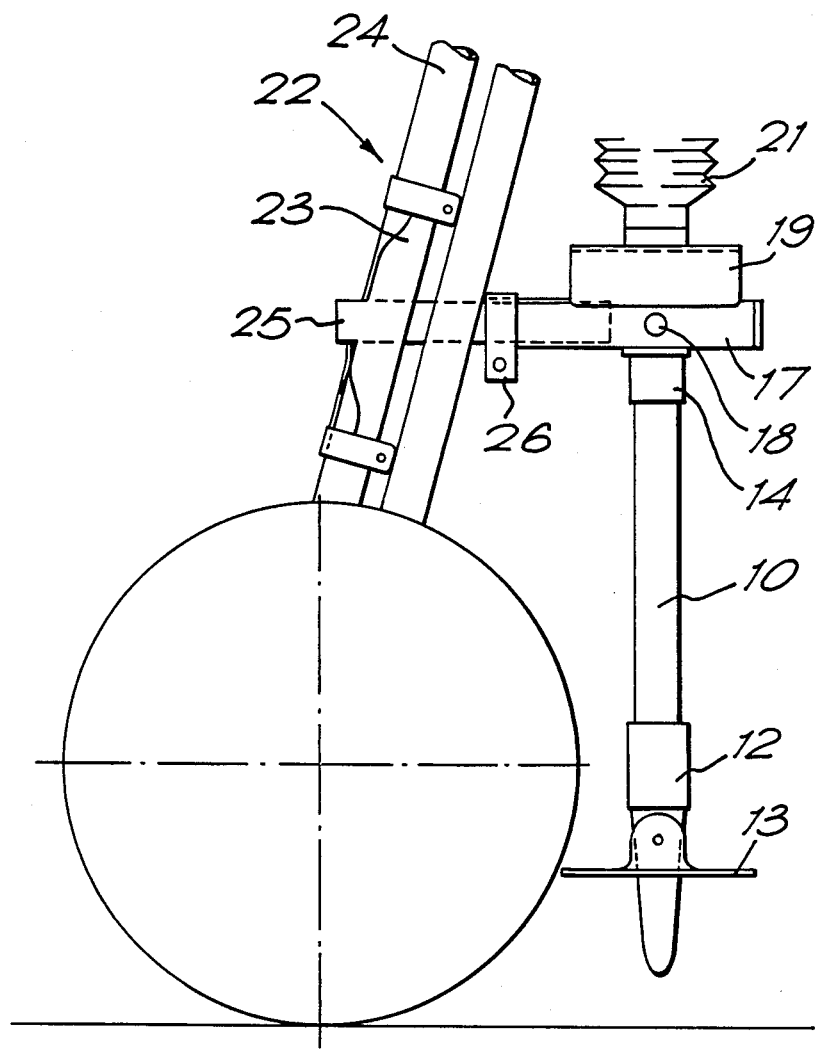

SEAT STRUCTURE FOR ATTACHMENT TO A GOLF CART OR TROLLEY

SUMMARY OF THE INVENTION

This invention relates to a seat structure which can be attached to a cart or trolley for carrying a bag of golf clubs and to a golf cart or trolley provided with such a seat.

When playing a round of golf it is usual for a player to use a hand pulled cart or trolley for transporting a bag of golf clubs around the golf course. There are times when a player has to wait some time before playing a shot and the use of a seat is very desirable at that time.

According to the present invention there is provided a seat structure which can be attached to a cart or trolley for carrying a bag of golf clubs, comprising a stem member, a seat provided at one end of said stem member, a tube through which said stem member extends and in which the stem member is slidable, first resilient means for urging the stem member in the direction of the seat, a mounting member, means pivotally connecting said tube to said mounting member, said mounting member being connectable to support structure provided on the cart or trolley, and second resilient means being provided between a member connected to the tube and the mounting member for returning the stem member to a mean or equilibrium position after it has been moved about the pivot.

BRIEF DESCRIPTION OF THE DRAWINGS

To the accomplishment of the foregoing and related ends, the invention then comprises the features fully hereinafter described and particularly pointed out in the claims, the following description and annexed drawings setting forth in detail an illustrative embodiment of the invention, this being indicative however of only one way in which the principles of the invention may be employed.

In said annexed drawings:

FIG. 3 is a partial side elevation showing the seat structure attached to a golf cart or trolley.

DESCRIPTION OF THE PREFERRED EMBODIMENT

Figure 1:
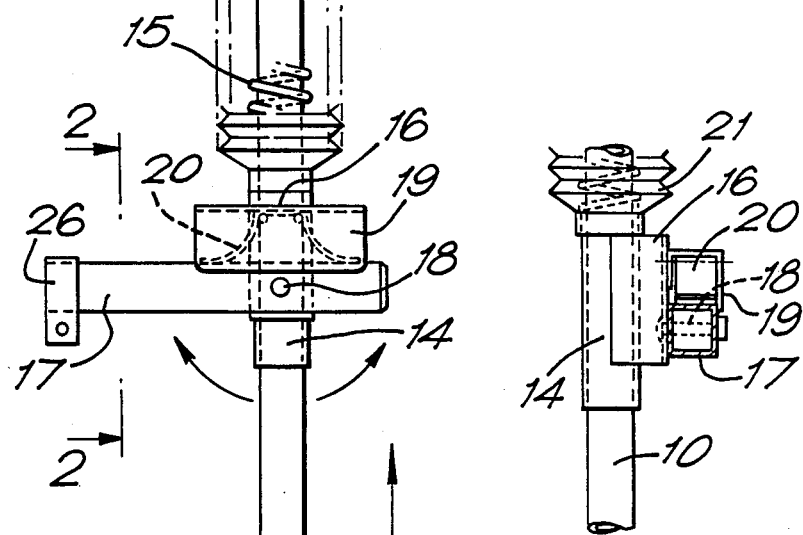
FIG. 1 is a side elevation of a seat structure according to the present invention.
Figure 2:
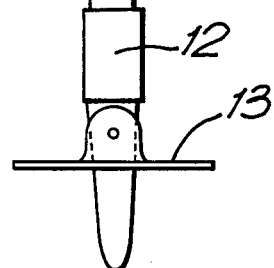
FIG. 2 is a section taken along the line 2—2 indicated on FIG. 1.

The seat structure comprises a tubular stem member 10 which is preferably formed of aluminum and which is provided at one end (the upper end) and a seat 11 which is a folding seat similar to seats used on so called shooting sticks and is provided at its other end (the lower end) with a pointed foot member 12 having a pivoted plate number 13 which again are similar to such members provided on the lower end of a shooting stick.

The stem member 10 extends through a tube 14 which is lined with a plastics liner and is slideable in the tube 14. Extending between the tube 14 and the seat 11 is a coil spring 15 which surrounds the stem member 10. The tube 14 is welded to a channel section bracket 16 which is pivotally connected to a square section tubular mounting member 17 by a bolt 18. It will be appreciated that the stem member 10 can be thus pivoted about the axis of the bolt 18.

Secured to the bracket 16 is a substantially U-section member 19 which extends transversely of the tube 14 and which is located above the mounting member 17. Extending between the member 19 and the mounting member 17 is a flat spring 20 which in side elevation is of channel section. The spring 20 applies a restoring force urging the stem member 10 to an equilibrium or mean position if it is moved about the axis of the bolt 18. The spring 15 is surrounded by a protective gaiter 21.

As will be seen from FIG. 3 the golf cart or trolley 22 is provided with seat support structure which consists of a bracket 23 which is clamped to a structural tube 24 of the cart or trolley 22 and a square section stem or rod 25 on which the mounting member 17 can be slid. The mounting member 17 is retained on the stem a rod 25 by a fixing clip or clamp 26. It will be appreciated that by releasing the clip or clamp 26 the seat structure can be disengaged from the rod 25 and used independently of the cart or trolley 22.

In use the compression spring 15 moves the stem number 10 away from the ground when the weight of the user is removed and the pivot action of the stem member 10 allows the seat structure to be used on uneven ground, i.e. on a slope.

It will be appreciated that many modifications and changes can be made without departing from the scope of the appended claims.

I, therefore particularly point out and distinctly claim as my invention:

1. A seat structure which can be attached to a cart or trolley for carrying a bag of golf clubs, comprising a stem member, a seat provided at one end of said stem member, a tube through which said stem member extends and in which the stem member is slidable, first resilient means for urging the stem member in the direction of the seat, a mounting member, means pivotally connecting said tube to said mounting member, said mounting member being connectable to support structure provided on the cart or trolley, and second resilient means being provided between a member connected to the tube and the mounting member for returning the stem member to a mean or equilibrium position after it has been moved about the pivot.

2. A seat structure as claimed in claim 1, wherein said tube is lined with a plastics liner.

3. A seat structure as claimed in claim 1, wherein said tube is secured to a bracket which is connected by said pivot to the mounting member.

4. A seat structure as claimed in claim 3, wherein said second resilient means comprises a channel section plate spring located between said bracket and said mounting member.

5. A seat structure as claimed in claim 1, wherein said mounting member comprises a tubular member provided at one end with a clamp or clip for retaining the mounting member on a stem or rod forming the support structure provided on the trolley or cart.

6. A seat structure as claimed in claim 1, wherein said first resilient means comprises a coil spring surrounding said stem member.

7. A seat structure as claimed in claim 1, wherein said first resilient means is surrounded by a protective gaiter.

8. A seat structure as claimed in claim 1, wherein said seat is foldable about one end of the stem member.

9. A seat structure as claimed in claim 1, wherein the other end of the stem member is provided with a pointed foot member having a pivotable ground engaging plate.

10. A golf cart or trolley provided with a seat structure as claimed in claim 1.

* * * * *
}